(12) United States Patent
Gunji et al.

(10) Patent No.: US 6,286,769 B1
(45) Date of Patent: Sep. 11, 2001

(54) METHOD OF COAXIALLY CONNECTING PRECISION PARTS COMPRISING A PLURALITY OF MEMBERS, METHOD OF ASSEMBLING FUEL INJECTION NOZZLE, AND FUEL INJECTION NOZZLE

(75) Inventors: Kenichi Gunji, Mito; Yoshiyuki Tanabe, Hitachinaka, both of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/486,227
(22) PCT Filed: Apr. 5, 1999
(86) PCT No.: PCT/JP99/01794
§ 371 Date: Feb. 24, 2000
§ 102(e) Date: Feb. 24, 2000
(87) PCT Pub. No.: WO99/51388
PCT Pub. Date: Oct. 14, 1999

(30) Foreign Application Priority Data
Apr. 6, 1998 (JP) .................................. 10-092954

(51) Int. Cl.$^7$ ............................ F02M 51/00; B21K 21/08
(52) U.S. Cl. ................................. 239/585.1; 29/890.143
(58) Field of Search .......................... 239/585.4, 585.1, 239/1; 29/890.143, 890.142, 506, 507

(56) References Cited

U.S. PATENT DOCUMENTS

| | | | |
|---|---|---|---|
| 5,127,156 | * 7/1992 | Yokoyama et al. | 29/890.143 |
| 5,871,157 | * 2/1999 | Fukutomi et al. | 239/463 |
| 5,979,801 | * 11/1999 | Munezane et al. | 239/463 X |
| 6,065,692 | * 5/2000 | Brinn, Jr. | 239/463 X |
| 6,145,761 | * 11/2000 | Muller et al. | 239/463 X |
| 6,170,762 | * 1/2001 | Sumida et al. | 239/463 |

FOREIGN PATENT DOCUMENTS

2236359-A * 4/1991 (GB).
4030320-A1 * 4/1991 (DE).

* cited by examiner

Primary Examiner—Lesley D. Morris
(74) Attorney, Agent, or Firm—Crowell & Moring LLP

(57) ABSTRACT

According to the present invention, a swirler and a plate are fitted into the inside diameter portion of a nozzle of a fuel injection valve so as to hold the swirler relative to a seat portion of the nozzle, centering between the seat portion of the nozzle and the inside diameter portion of the swirler by a positioning pin, and the plate is caused to plastic flow locally to connect and fix the nozzle, the swirler and the plate whereby maintaining the coaxial degree after connection of parts without influence of accuracy of an individual part of parts of the nozzle of the fuel injection valve.

5 Claims, 6 Drawing Sheets

METHOD OF COAXIALLY CONNECTING PRECISION PARTS COMPRISING A PLURALITY OF MEMBERS, METHOD OF ASSEMBLING FUEL INJECTION NOZZLE, AND FUEL INJECTION NOZZLE

TECHNICAL FIELD

The present invention relates to a concentric connecting method for precise parts comprising a plurality of members, a method for assembling a nozzle of a fuel injection valve making use of the former, and a fuel injection valve.

BACKGROUND ART

For a concentric connecting method for precise parts comprising a plurality of members, an example of a conventional nozzle assembly will be described with reference to Japanese Patent Publication No. Hei. 7-10471 (corresponding to U.S. Pat. No. 5,127,156, GB 2,236,359, DE 4,030,320). In FIG. 1 of the aforesaid Publication, a tapered hole (a valve seat) 10c is formed in the inner bottom provided with an orifice 11 of a nozzle body (an outer tubular part) 10, a swirler (an inner tubular part) 12 with a through-hole 12a is installed within the nozzle body 10 while securing a clearance therebetween, the vicinity (on the swirler side) of a fitting portion between the swirler 12 and the nozzle body 10 is pressed by a punch 16 so as to generate a local plastic flow while centering the tapered hole 10c with respect to the through-hole 12a of the swirler 12 by a positioning guide pin 14, and both the parts are connected concentrically by force of the plastic flow thus generated. The swirler 12 is internally formed with a fuel swirling force generating groove for applying swirl to fuel, and fuel is injected out of a fuel injection valve while swirling.

As mentioned in the above prior art, a swirler (an inner tubular part) 12 with a through-hole 12a is installed within the nozzle body 10 while securing a clearance G therebetween, the vicinity of a fitting portion of the swirler 12 is pressed by a punch 16 so as to generate a local plastic flow while centering the tapered hole 10c with respect to the through-hole 12a of the swirler 12 by a positioning guide pin 14, and both the parts are connected concentrically by force of the plastic flow, in such a case, a residual stress due to the plastic flow occurs without fail in the connecting portion.

If a coaxial degree of the inside and outside diameters of the swirler 12 is 0, and a coaxial degree of the inside diameter of the nozzle body 10 and the tapered hole 10c is 0, the residual stress is generated uniformly over the whole circumference, by which ideal concentric connection is attained. However, where either of the parts has deflection, that is, the coaxial degree is not 0, or where the coaxial degree between the outside diameter and the inside diameter of the swirler 12 is not 0, the dimension of the clearance G in the whole circumference is partly varied, so that the residual stress of the whole circumference of the connecting portion becomes unbalanced. Because of this, when the positioning guide pin 14 is removed, the spring back amount in the whole circumference is different due to the unbalance of the residual stress, resulting in deviation of center. As described, in the conventional method, there remains considerably an influence of accuracy of an individual part of the parts on the coaxial degree after connection. In the case of the embodiment in the aforesaid Publication, the coaxial degree after connection is 5.8 μm on the average.

Further, where both the nozzle body 10 and the swirler 12 are formed of a combination of materials that are not subjected to plastic flow, such as a hardening material, it is impossible to connect both the parts making use of plastic flow. Therefore, the method as in the above-described prior art cannot be employed.

DISCLOSURE OF INVENTION

An object of the present invention is to provide a concentric connecting method for precise parts comprising a plurality of members, a method for assembling a nozzle of a fuel injection valve making use of the former, and a fuel injection valve, which are free from influence of precision of an individual part of parts, and capable of keeping a coaxial degree after connection.

For achieving the aforementioned object, the present invention provides a method comprising: fitting a swirler and a plate so that the swirler is held between a seat portion of a nozzle and the plate in an inside diameter portion of a nozzle of a fuel injection valve, centering the seat portion of the nozzle with respect to an inside diameter portion of the swirler, causing the plastic flow locally on the plate, and connecting and fixing the nozzle, the swirler and the plate.

More specifically, where a swirler is concentrically fixed to a nozzle body, both are fitted in a state in which the swirler is placed on the internal bottom of the nozzle body and fitted with the nozzle body while securing a clearance between the inside diameter portion of the nozzle body and the outside diameter portion of the swirler; a plate having a through-hole slightly larger than a through-hole of the swirler for fixing the swirler so as to be held in a sandwich-like manner is fitted on the upper surface of the swirler; in such a fitting state, a positioning guide pin having substantially the same diameter as the inside diameter portion of the swirler and formed at a tip thereof with the centering surface relative to a tapered hole (a valve seat) of the nozzle body and the insert guide surface is inserted into the inside diameter portion of the swirler till the tip of the pin comes into contact with the tapered hole (valve seat) of the nozzle body to carry out temporary concentric positioning of the inside diameter portion of the swirler and a tapered hole of the nozzle body; and in the temporary positioning state, a punch is moved and guided in the same direction as the inserting direction of the positioning guide pin along the outer circumference of the positioning guide pin, the vicinity of a fitting portion between the plate and the nozzle body (mainly the plate side) is pressed by the punch so that a local plastic flow occurs, and the swirler is fixed to the nozzle body through force of plastic flow acting in the diametral direction and the axial direction generated in the plate to connect and fix the plate to the nozzle body.

Deviation in center occurs in the plate after connection because the unbalance of clearance in the whole circumference causes the spring back amount different, similarly to the case of the swirler in the prior art. However, an tapered hole of the nozzle (valve seat) and the swirler requiring high coaxial degree are merely fixed by being held between the plate and the nozzle, and the spring back due to the residual stress is not exerted, accordingly, they are connected and fixed intact at the position determined by a positioning guide pin, and the tapered hole of the nozzle (valve seat) and the swirler are maintained in high coaxial degree.

BEST MODE FOR CARRYING OUT THE INVENTION

The embodiments of the present invention will be described hereinafter with reference to the drawings.

Figure 7:
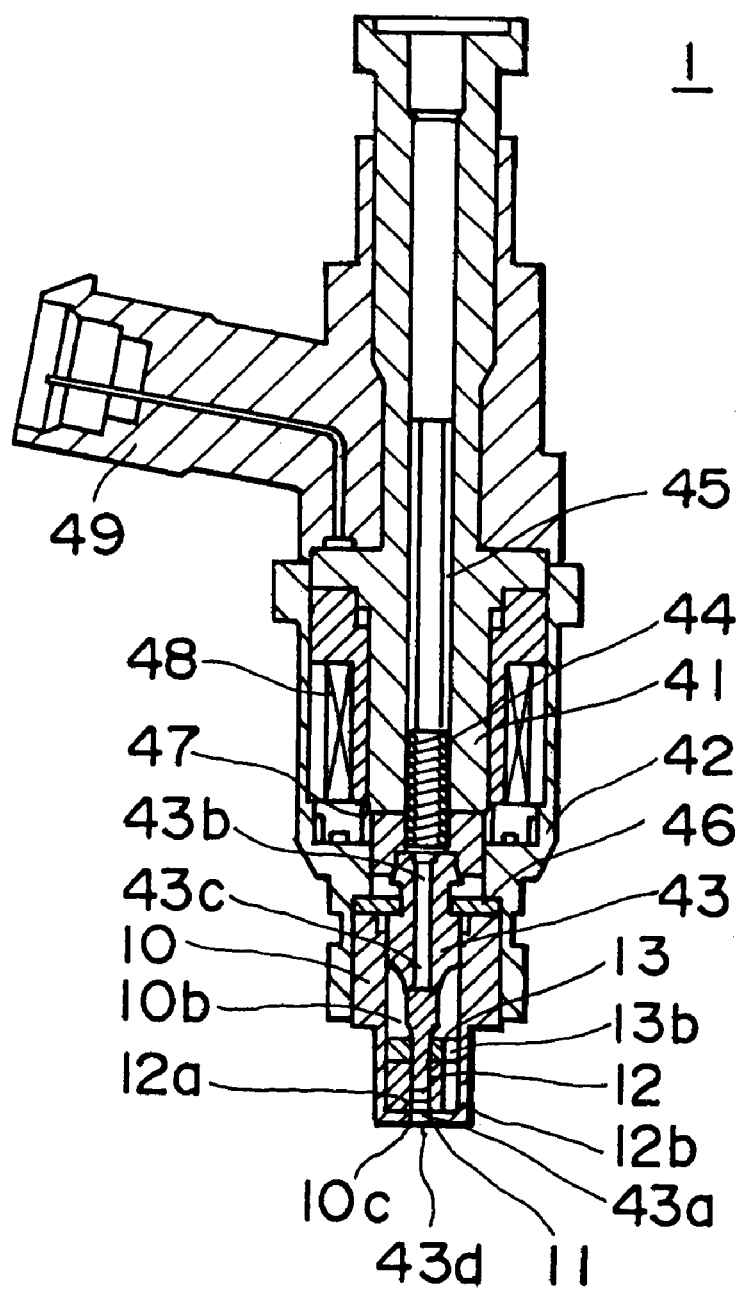
FIG. 7 is a longitudinal sectional view of a fuel injection valve.

FIG. 7 shows a longitudinal sectional view of a fuel injection valve for a gasoline engine of an automobile to which the present invention is applied.

Main portions of a fuel injection valve body 1 comprise a magnetic circuit having a core 41, a yoke 42 and a movable valve 43, a coil 48 for exciting the magnetic circuit, and a terminal bobbin 49 for energizing the coil 48. The core 41 is provided internally with a movable valve 43 provided at an end therewith a valve seat 43a, a spring 44 for pressing a seat portion 10c of a nozzle 10, an adjuster 45 for adjusting a pressing load of the spring 44, a stopper 46 serving as a stroke end of the movable valve 43, a swirler 12 for applying a swirling force to fuel, a plate 13 for fixing the swirler 12 to the nozzle 10, and a ring 47 for preventing fuel from coming out from between the core 41 and the yoke 42, supporting the dry coil construction.

When the coil 48 of the fuel injection valve body 1 is energized, the movable valve 43 is moved in the direction of the core 41 against the bias of the spring 44 to form a clearance between a ball valve 43d at the end of the movable valve 43 and an orifice 11. Pressurized fuel passes through the core 41, the adjuster 45, the ring 47, fuel passages 43b, 43c in the movable valve, a fuel passage 10b of the nozzle 10, and a fuel passage 13b of the plate 13, and is applied with a swirling force by a swirler groove 12b of the swirler 12 and is injected from the orifice 11. On the other hand, where a current of the coil 48 is intercepted, the ball valve 43d of the movable valve 43 is brought into contact with the seat portion 10c by force of the spring 44 to assume a closed-valve state.

The method of assembling and connecting the nozzle 10 as an outer tubular part of the fuel injection valve body 1 constructed as described above, the swirler 12 as an inner tubular part incorporated therein and the plate 13 will be described hereinafter.

Figure 1:
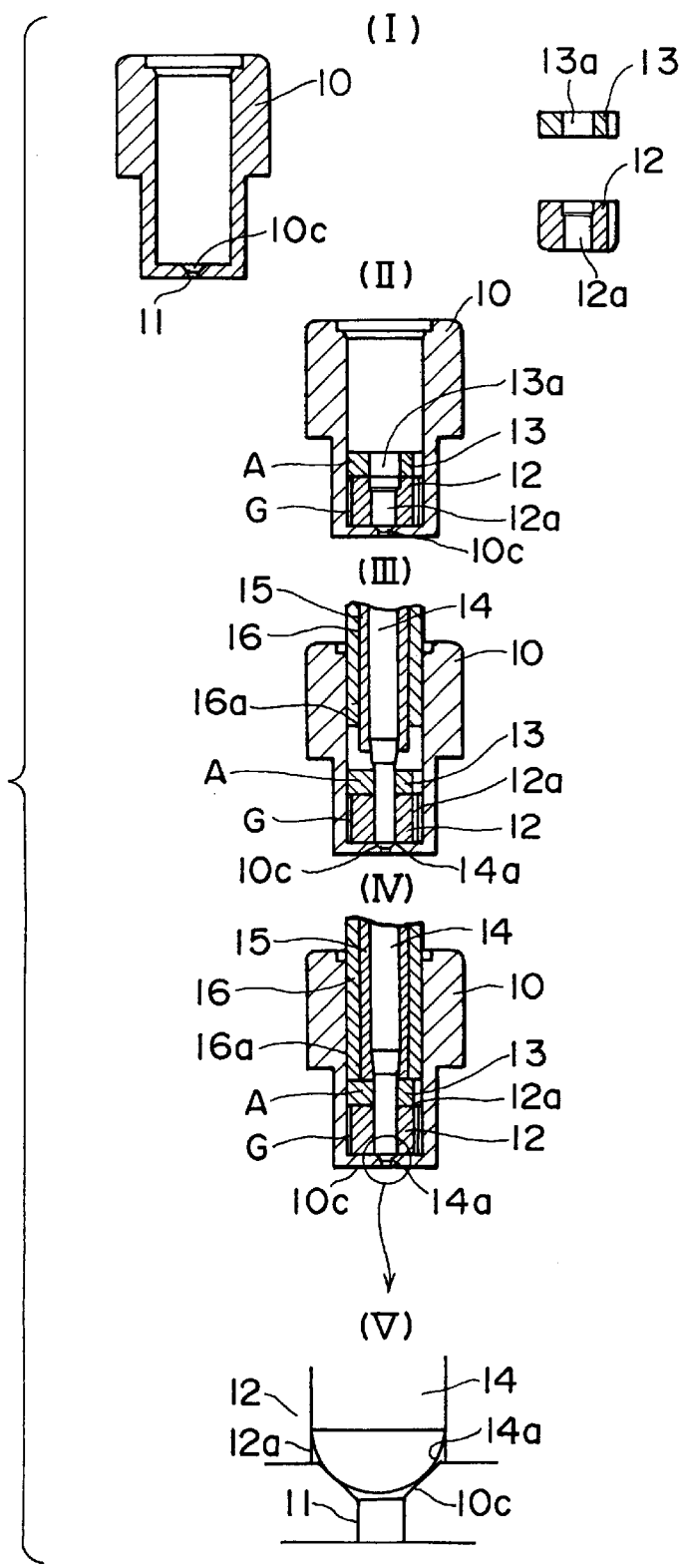
FIG. 1 is a longitudinal sectional view showing the steps of a method for connecting parts of a fuel injection valve, according to a first embodiment of the present invention.
Figure 2:
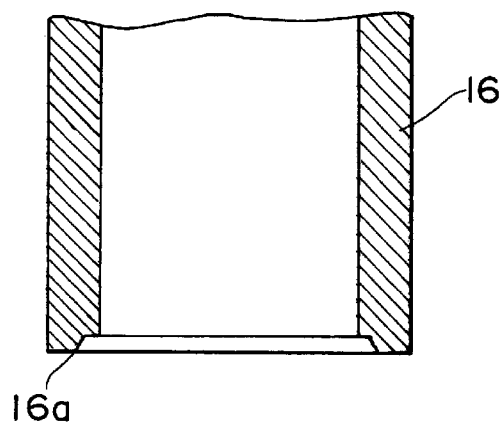
FIG. 2 is a longitudinal sectional view of a punch 16 used in the steps of a method for connecting parts of a fuel injection valve shown in FIG. 1.
Figure 3A:
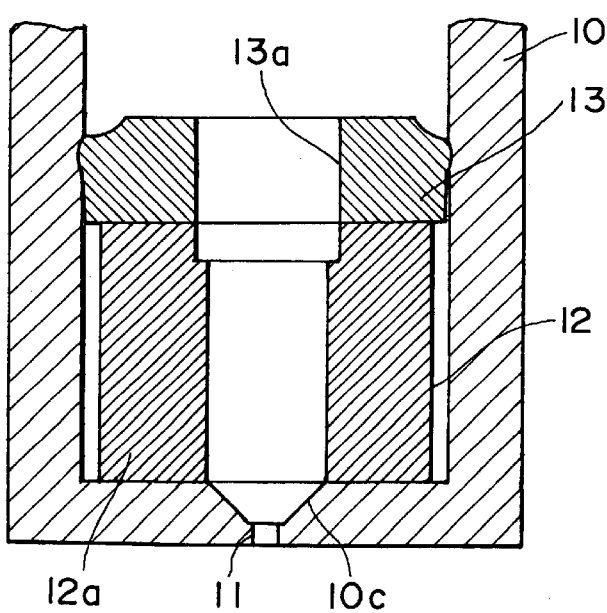
FIG. 3A is a longitudinal sectional view of a plate 13 and a swirler 12 after being pressed by the punch 16 shown in FIG. 2 and a nozzle 10.
Figure 4:
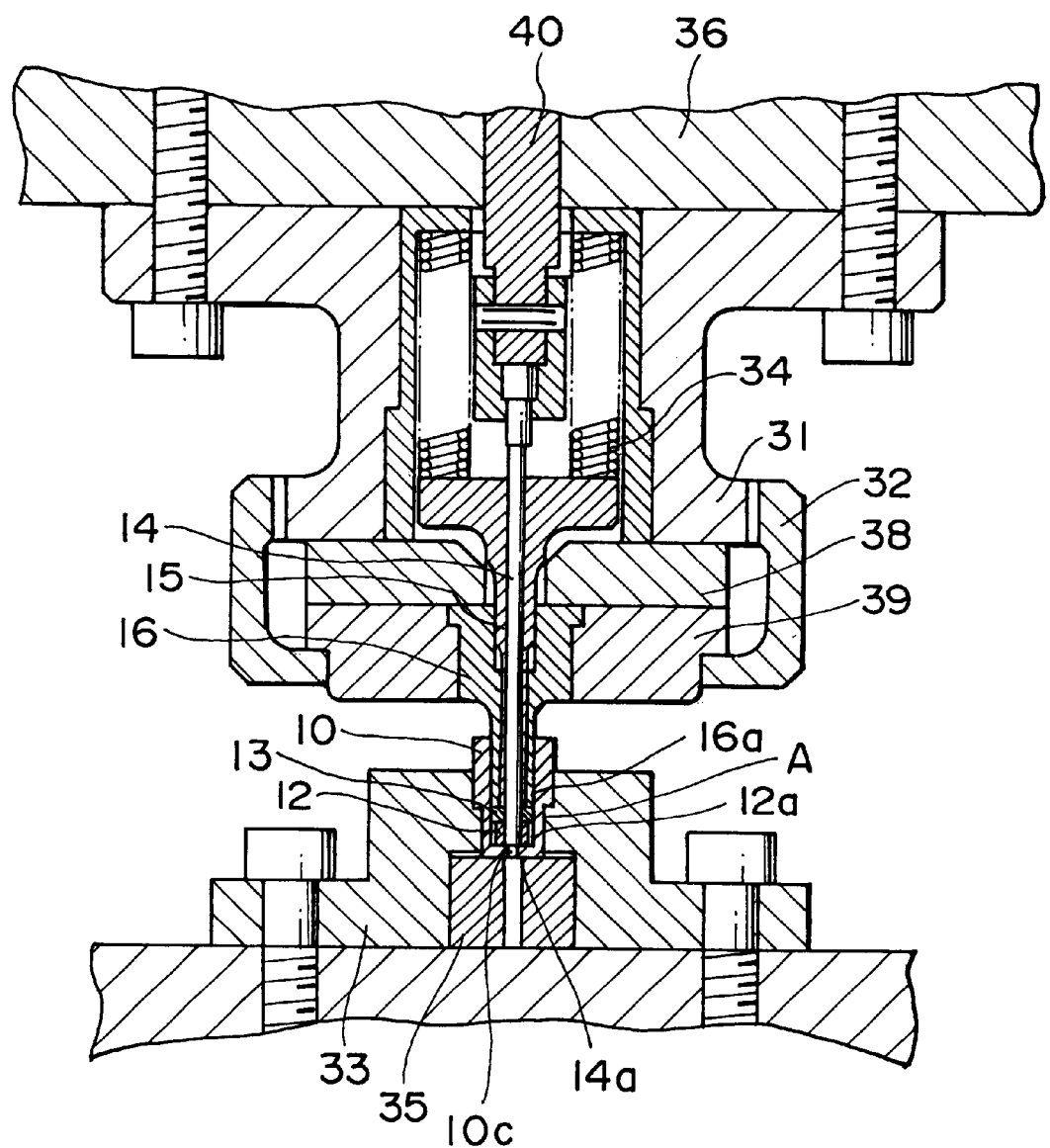
FIG. 4 is a longitudinal sectional view of a jig and a work machine showing the work of a method for connecting parts shown in FIG. 1.
Figure 5:
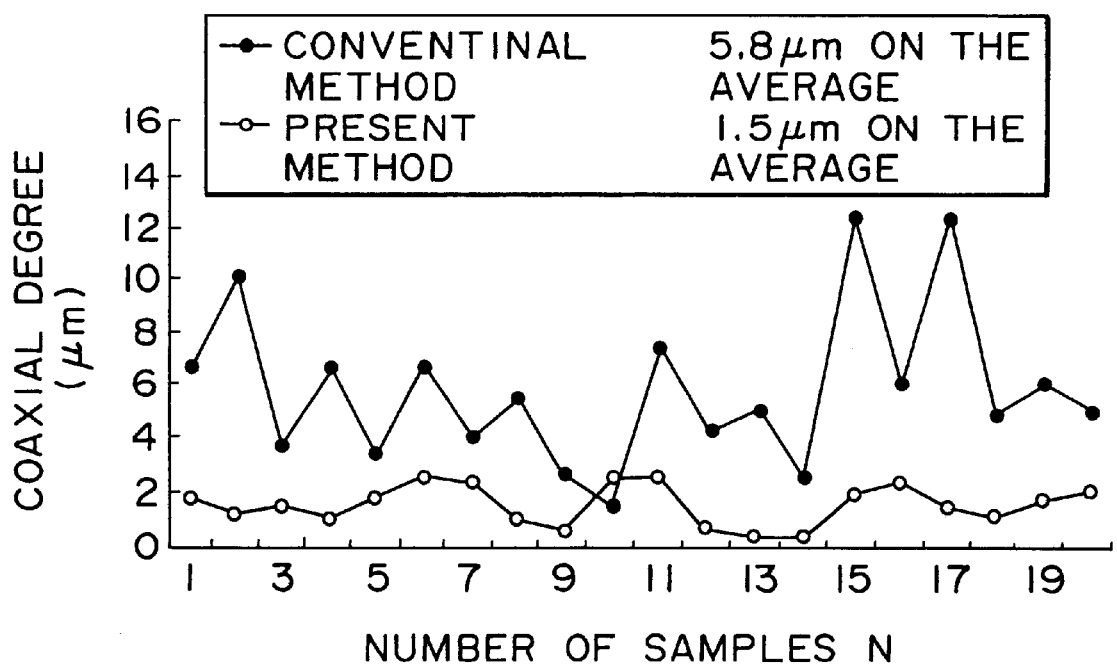
FIG. 5 is a line graph showing comparison between a coaxial degree of a nozzle and a swirler in case where a connecting method according to the first embodiment of the present invention and a coaxial degree in case where a conventional method is employed.

FIG. 1 is a longitudinal sectional view showing the steps for a method for connecting parts of a fuel injection valve shown in FIG. 7, according to a first embodiment of the present invention, FIG. 2 is a longitudinal sectional view of a punch 16, FIG. 3A is a longitudinal sectional view of a plate 13 and a swirler 12 after being pressed by the punch 16 and a nozzle 10, FIG. 4 is a longitudinal sectional view of a jig and a work machine showing the work of a method for connecting parts shown in FIG. 1, and FIG. 5 is a line graph showing comparison between a coaxial degree of a nozzle and a swirler when adopting a connecting method according to the first embodiment of the present invention and a coaxial degree when adopting a conventional method.

FIG. 1 (I) is a longitudinal sectional view of a nozzle 10, a swirler 12 and a plate 13 which are parts to be connected. The nozzle 10, the swirler 12 and the plate 13 are provided with a seat portion 10c, an inside diameter portion 12a and a through-hole 13a, respectively.

FIG. 1 (II) shows a state in which the above-described parts are combined. First, the swirler 12 is fitted into the nozzle 10 while securing a clearance G between the inside and outside diameters thereof, and the plate 13 is fitted into the upper portion of the swirler 12 so as to hold the swirler 12 in the form of sandwich. In the figure, A designates a fitting place of the plate 13.

Next, in the above fitted state, a positioning pin 14 having substantially the same diameter as the inside diameter of the swirler 12 and the outside diameter which is smaller than the inside diameter of the through-hole 3a of the plate 13 to an extent of maintaining a gap therebetween is pushed into the inside diameter portion 12a of the swirler 12 till the pin tip 14a comes into contact with the seat portion 10c of the nozzle 10. The positioning pin 14 comes into contact with the tapered seat portion 10c in the inner bottom of the nozzle 10 whereby the seat portion 10c and the inside diameter portion 12a of the swirler 12 are temporarily positioned in the concentric state. This temporary positioning is done so that in the stage as shown (II) in FIG. 1, if deviation in center occurred between the seat portion 10c and the inside diameter portion 12a of the swirler 12, the deviation in center is absorbed by the clearance G. FIG. 1 (V) shows an enlarged view of the positioning pin tip 14a and the seat portion 10c.

Next, in the temporary positioning state, mechanical local pressing force is applied to the fitting place A of the plate 13 to generate a plastic flow to where the pressing force is applied, as shown in FIG. 1 (IV). This mechanical pressing is carried out, as shown (III) to (IV) in FIGS. 1, by fixing the plate 13 and the swirler 12 into the nozzle 10 with a keep element 15 while the positioning pin 14 is inserted into the inside diameter portion 12a of the swirler 12, and pressing the vicinity of the outside diameter of the plate 13 by a projection 16a provided at the end of the punch 16 shown in FIG. 2. As a result, as shown in FIG. 3A, the plate 13 after being pressed by the punch 16 is plastic connected to the nozzle 10 in the state in which the swirler 12 is pressed in the direction of the seat portion 10c of the nozzle 10.

In FIG. 4, where as a work machine, a press machine is used for carrying out work according to the aforementioned connecting method, first, the nozzle 10, the swirler 12 and the plate 13 are inserted into and set to a receiver 33 and a receiver 35. On the ram 36 of the press machine are mounted with a keep element 31, a keep element 32, a backing plate 38, a punch holder 39, a positioning pin 14, a keep element 15, a punch 16, a sub-cylinder 40, a keep spring 34 and so on. The keep element 15 and the punch 16 are arranged concentrically in the outer periphery of the positioning pin 14. The positioning pin 14 mounted on the sub-cylinder 40 vertically moves as the sub-cylinder 40 moves vertically, and the keep element 15 is pressed in the direction of the receiver 35 by the keep spring 34, and other parts move vertically as the ram 36 moves vertically.

Figure 3B:
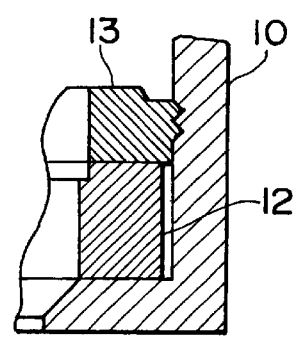
FIG. 3B is a partly longitudinal sectional view showing another example of connecting the plate 13 and the nozzle 10.

The sub-cylinder 40 is moved down to move down the positioning pin 14, and the positioning pin 14 is pushed into the inside diameter portion 12a of the swirler 12 till the pin tip 14a comes into contact with the seat portion 10c of the nozzle 10. The keep element 15 firmly holds the plate 13 and the swirler 12 to the nozzle 10 by means of force of the keep spring 34. In this state, the ram 36 is moved down, the punch 16 is moved along the outer circumference of the positioning pin 14, and the projection 16a of the punch 16 comes into contact with the plate 13. When force for moving down the ram 36 is applied, a plastic flow occurs in the fitting place A in the vicinity of the outside diameter of the upper surface of the plate 13, and tension and shearing force caused by the plastic flow exert on the inside diameter side of the nozzle 10, whereby the nozzle 10 and the plate 13 are connected in the state in which the swirler 12 is held therebetween. For obtaining firm connection, a connecting groove may be provided in the fitting portion of either the nozzle 10 or the plate 13, as shown in FIG. 3B. Or, better connection can be obtained to employ a material, for the plate 13, softer than that of the nozzle 10.

After connection has been completed, the sub-cylinder 40 is moved up while lifting up the ram 36, the positioning pin 14 is removed from the swirler 12, and the ram 36 is further lifted up, thus completing the process. Here, order is that first, after the punch 16 has been moved away from the plate 13, the positioning pin 14 is moved away from the seat portion 10c, and then from the inside diameter portion 12a of the swirler 12.

As described above, according to the first embodiment of the present invention, where the swirler 12 is incorporated into the nozzle 10, the press machine is used to connect the plate 13, the nozzle 10 and the swirler 12, and the coaxial degree between the seat portion 10c of the nozzle 10 and the inside diameter portion 12a of the swirler 12 after connection can be maintained well.

Where the fuel injection valve is fabricated according to the aforementioned steps, the coaxial degree between the seat portion 10c of the nozzle 10 and the inside diameter portion 12a of the swirler 12 is maintained with high accuracy, and therefore, the contact of the ball valve 43d of the movable valve 43 with respect to the seat portion 10c when the valve is closed is secured to prevent a leakage of fuel. Further, since an annular clearance between the seat portion 10c and the ball valve 43d when the valve is open can be made uniform, thereby eliminating unevenness upon spraying fuel. Further, since the swirler 12 is not connected by direct pressure, the wall-thickness of the swirler 12 can be made thin to thereby enable miniaturization. Even if the coaxial degree between the inside and outside diameters of the swirler 12 is 20 μm or more, for example, the better coaxial degree with the seat portion 10c is obtained after connection, and therefore, precise processing on the swirler 12, such as grinding, is not necessary. Therefore, fabrication is made possible by adopting a processing method excellent in productivity such as cutting, and an inexpensive manufacturing method for sintered parts or the like. Further, since the swirler and the nozzle can be connected by the plastic flow of the plate, the swirler 12 can be formed of materials having abrasion resistance such as a hardening material, a carbide material, a ceramic material and the like, or a material with surface treatment having abrasion resistance.

FIG. 5 is a line graph showing the result of comparison between a coaxial degree of the seat portion 10c and the inside diameter portion 12a of the swirler 12 in case where connection is made according to the first embodiment of the present invention, and data of a coaxial degree according to a conventional method. In FIG. 5, the axis of abscissae indicates the number of samples of the products, and the axis of ordinates indicates the coaxial degree.

While in the conventional method, the coaxial degree is 5.8 μm on the average, it is noted that according to the first embodiment of the present invention, the coaxial degree is 1.5 μm on the average, enabling achievement of very high coaxial degree.

Figure 6:
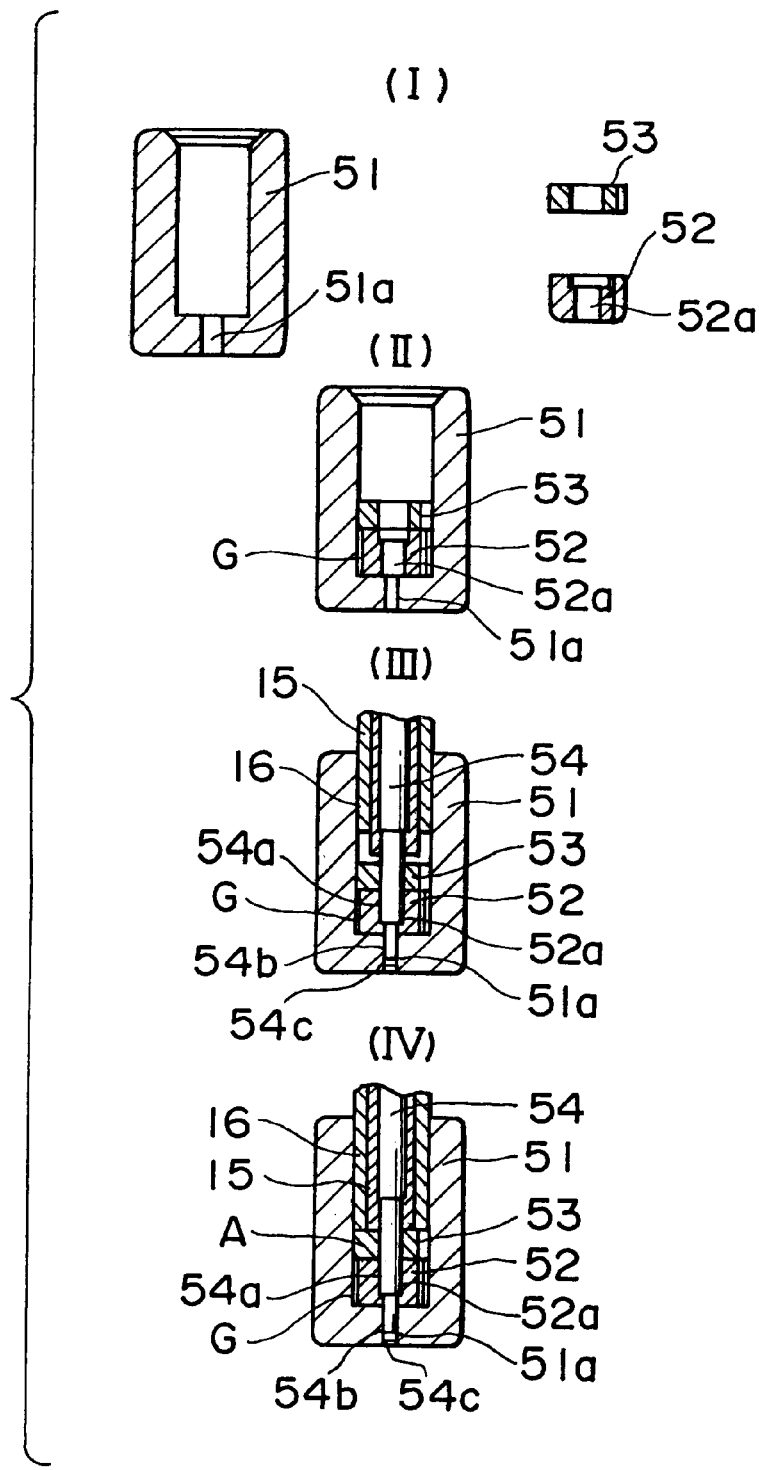
FIG. 6 is a longitudinal sectional view showing the steps of a method for connecting parts of a fuel injection valve, according to a second embodiment of the present invention.

FIG. 6 is a longitudinal sectional view of a second embodiment of the present invention, showing the steps for a method for connecting parts of a fuel injection valve shown in FIG. 7, similarly to FIG. 1.

In the second embodiment of the present invention, an outer tubular part 51 provided with a cylindrical hole 51a, as shown in FIG. 6 (I) is provided in place of the orifice 11 of the nozzle 10 according to the first embodiment shown in FIG. 1. Further, the seat portion 10c of FIG. 1 is not provided neither. In the second embodiment, the fuel injection valve is constructed not like that shown in FIG. 7, in which the ball valve 43d is provided on the movable valve 43, and the valve is opened and closed by the ball valve 43d and the seat portion 10c, but a spindle type valve not shown is inserted into the cylindrical hole 51a as shown in FIG. 6. The inside diameter of the inside diameter portion 52a of the inner tubular part 52 constructed as described above is set to be larger than the inside diameter of the cylindrical hole 51a of the outer tubular part 51.

In case of positioning the outer tubular part 51, the inner tubular part 52 and the plate 53, it is necessary to insert a positioning pin 54 into the cylindrical hole 51a of the outer tubular part 51 from the inside diameter portion 52a side of the inner tubular part 52, as shown in FIGS. 6 (I) to (III), to center the inside diameter portion 52a with respect to the cylindrical hole 51a. To this end, in the present embodiment, the shape of the positioning pin 54 is designed so that a first portion 54a having substantially the same diameter as that of the inside diameter portion 52a and a second portion 54b having substantially the same diameter as that of the cylindrical hole 51a are provided, and a difference in level is provided between the first portion 54a and the second portion 54b which are different in diameter. A pin tip 54c of the positioning pin 54 is formed to be converged in the form of taper to serve as a guide for insertion. Thus, even if a deviation in center occurs between the cylindrical hole 51a of the outer tubular part 51 and the inside diameter portion 52a of the inner tubular part 52, when the positioning pin 54 is inserted, the second portion 54b and the first portion 54a come into contact with the cylindrical hole 51a and the inside diameter portion 52a, respectively, so that the inner tubular part 52 is moved laterally towards where the clearance G is present to absorb the deviation in center.

Thereafter, if a local plastic flow is generated at the fitting place A of the plate 53 by the punch 16, as shown in FIG. 6 (IV), the outer tubular part 51 and the plate 53 are connected while holding the inner tubular part 52 therebetween. In this case, since the punch 16 is moved and guided in the same direction as the positioning pin 54 along the outer periphery of the positioning pin 54, the inner tubular part 52 is pressed against the bottom of the outer tubular part 51 through the plate 53, so that they are fixed.

As described above, according to the second embodiment of the present invention, the inner tubular part 52, the plate 53 and the outer tubular part 51 can be fixed while maintaining the coaxial degree between the inner tubular part 52 and the outer tubular part 51 without being affected by the spring back caused by accuracy of an individual part of parts and residual stress. Further, If the plate 53 is made possible to plastic flow, materials for the outer tubular part 51 and the inner tubular part 52 are freely combined.

As mentioned in the foregoing embodiments, according to the present invention, the positioning accuracy of precise parts is enhanced, and the outer tubular part and the inner tubular part can be automatically incorporated in a short period of time using a pressing machine such as a press, therefore, excellent mass-production becomes possible, allowing a higher freedom of a combination of parts materials, thus enhancing the durability of the sliding portion of the fuel injection valve. Further, since the spring back amount of the whole circumference of the inner tubular part is not different due to the unbalance of residual stress at the time of fixing after connection, the coaxial degree can be maintained, and it is not necessary to take the accuracy of an individual part of parts into consideration. Because the coaxial degree is maintained, the stable operation of the movable valve can be accomplished, and unevenness upon spraying fuel can be eliminated. Further, the outer tubular part and the inner tubular part can be made thinner in wall-thickness to thereby miniaturize and reduce weight of the fuel injection valve.

As described above, according to the present invention, it is possible to maintain the coaxial degree after connection without influence of the accuracy of an individual part of parts.

What is claimed is:

1. A fuel injection valve comprising a movable valve, a magnetic circuit for moving said movable valve, and a tubular nozzle encasing therein a swirler having a groove for imparting a swirling force to fuel and an inside diameter portion for guiding movement of said movable valve and having a fuel injection orifice, wherein said swirler is fixed by being held between a plate connected to said nozzle and a bottom of said nozzle by the plastic flow.

2. A concentric connecting method for precise parts comprising a plurality of members, said method comprising the steps of:

where an inner tubular part having a through-hole in the center is incorporated into an outer tubular part with a bottom having a tapered hole in the center portion of an inner bottom, placing said inner tubular part on the internal bottom of said outer tubular part while securing a clearance between the inside diameter portion of said outer tubular part and the outside diameter portion of said inner tubular part;

fitting a second inner tubular part into said outer tubular part in a manner such that said inner tubular part is held between the internal bottom of said outer tubular part and said second inner tubular part;

inserting, in said fitting state, into the through-hole of said inner tubular part a positioning pin having substantially the same diameter with said through-hole of said inner tubular part and formed at a tip thereof with a centering surface relative to said tapered hole and an insertion guide surface till said pin tip comes into contact with a tapered hole of said outer tubular part, and performing temporary concentric positioning of the through-hole of said inner tubular part and the tapered hole of said outer tubular part; and moving and guiding, in said temporary positioning state, a punch in the same direction as the inserting direction of the guide pin along the outer circumference of said guide pin, pressing by said punch the vicinity of fitting portion of either said second inner tubular part or said outer tubular part so as to generate a local plastic flow, connecting said second inner tubular part and said outer tubular part by force of said plastic flow, and fixing said inner tubular part by said second inner tubular part and said outer tubular part.

3. The concentric connecting method for precise parts comprising a plurality of members according to claim 2, wherein a work keep element and said punch are arranged concentric with said positioning pin on the outer circumference thereof;

in said temporary positioning state, said positioning pin is operated using a sub-cylinder of a press machine; and said punch is moved separately from said positioning pin and said work keep element by a ram of said press machine while holding the upper surface of said second inner tubular part by said work keep element.

4. A concentric connecting method for precise parts comprising a plurality of members, said method comprising:

where an inner tubular part having a through-hole than larger that of an outer tubular part in the center is incorporated into the outer tubular part with a bottom having a through-hole in the center portion of an inner bottom, placing said inner tubular part on the internal bottom of said outer tubular part while securing a clearance between the inside diameter portion of said outer tubular part and the outside diameter portion of said inner tubular part;

fitting a second inner tubular part into said outer tubular part in a manner such that said inner tubular part is held between the internal bottom of said outer tubular part and said second inner tubular part;

inserting, in said fitting state, from the through-hole of said inner tubular part to the through-hole of said outer tubular part a positioning pin formed at a tip thereof with an insertion guide surface, and performing temporary concentric positioning of the through-hole of said inner tubular part and said through-hole of said outer tubular part; and moving and guiding, in said temporary positioning state, a punch in the same direction as the inserting direction of the positioning pin along the outer circumference of said positioning pin, pressing by said punch the vicinity of fitting portion of either said second inner tubular part or said outer tubular part so as to generate a local plastic flow, connecting said second inner tubular part and said outer tubular part by force of said plastic flow, and fixing said inner tubular part by said second inner tubular part and said outer tubular part.

5. An assembly method for a fuel injection valve comprising a movable valve, a magnetic circuit for moving said movable valve, and a tubular nozzle encasing therein a swirler having a groove for imparting a swirling force to fuel and an inside diameter portion for guiding movement of said movable valve and having a fuel injection orifice, said method comprising the steps of:

where said swirler is incorporated into said nozzle, fitting said swirler into said nozzle in a state of being placed on the internal bottom of said nozzle body while securing a clearance between the inside diameter portion of said nozzle and the outside diameter portion of said swirler, further, fitting into the upper surface of said swirler a plate having a through-hole slightly larger than a through-hole of said swirler and for holding said swirler therein;

in said fitting state, inserting into the inside diameter portion of said swirler a positioning pin having substantially the same diameter of said inside diameter portion and having a centering surface relative to said fuel injection orifice at a tip thereof till the pin tip comes into contact with said nozzle, and performing temporary concentric positioning of the inside diameter portion of swirler and said nozzle; and in said temporary positioning state, moving and guiding a punch in the same direction as the inserting direction of said positioning pin along the outer circumference of said positioning pin, pressing the fitting portion between said plate and said nozzle by said punch so as to generate a local plastic flow, connecting said plate to said nozzle, and fixing said swirler to said nozzle.

* * * * *